United States Patent [19]

Agrawal et al.

[11] Patent Number: 5,870,735
[45] Date of Patent: Feb. 9, 1999

[54] METHOD AND SYSTEM FOR GENERATING A DECISION-TREE CLASSIFIER IN PARALLEL IN A MULTI-PROCESSOR SYSTEM

[75] Inventors: Rakesh Agrawal; Manish Mehta, both of San Jose, Calif.; John Christopher Shafer, Amherst, Mass.

[73] Assignee: International Business Machines Corporation, Armonk, N.Y.

[21] Appl. No.: 641,404

[22] Filed: May 1, 1996

[51] Int. Cl.⁶ .................................................. G06F 17/30
[52] U.S. Cl. ..................... 707/3; 707/6; 707/7; 707/103
[58] Field of Search ............................... 707/3, 7, 6, 103

[56] References Cited

PUBLICATIONS

R. Agrawal, T. Imielinski, & A. Swami, "Database Mining: A Performance Perspective", IEEE Transactions On Knowledge And Data Engineering, vol. 5, No. 6, Dec. 1993.
S. M. Weiss & C. A. Kukikowski, "Computer Systems That Learn", pp. 113–143, Kaufmann Pub. Inc., 1991.
R. Agrawal et al., An Interval Classifier for Database Mining Applications, Proceedings of the 18th VLDB Conference Vancouver, British Columbia, Aug. 1992.
R. Agrawal et al., Database Mining: A Performance Perspective, IEEE Transactions on Knowledge and Data Engineering, vol. 5, No. 6, pp. 914–925, Special Issue on Learning and Discovery in Knowledge–Based Databases, Dec. 1993.
L. Breiman (Univ. of CA–Berkeley) et al. Classification and Regression Trees (Book) Chapter 2. Introduction to Tree Classification pp. 18–58, Wadsworth International Group, Belmont, CA, Jan. 1984.
J. Catlett, Megainduction: Machine Learning on Very Large Databases, PhD thesis, Univ. of Sydney, Jun./Dec. 1991.
P. K. Chan et al., Experiments on Multistrategy Learning by Meta–learning. In Proc. Second Intl. Conf. on Info. and Knowledge Mgmt., pp. 314–323, Jan. 1993.

D. J. DeWitt, J. F. Naughton and D. A. Schneider, Parallel Sorting on Shared–Nothing Architecture Using Probabilistic Splitting, In Proc. of the 1st Int'l Conf. on Parallel and Distributed Information Systems, pp. 280–291, Dec. 1991.
U. Fayyad et al., The Attribute Selection Problem in Decision Tree Generation. In 105h Nat'l Conf. on AI AAAI–92, Learning: Inductive Jan. 1992.
M. James, Classification Algorithms (book), Chapters 1–3, QA278.65, J281 Wiley–Interscience Pub., Jan. 1985.
M. Mehta et al., Mdl–based Decision Tree Pruning. Int'l Conference on Knowledge Discovery in Databases and Data Mining (KDD–95) Montreal, Canada, pp. 216–221, Aug. 1995.
J. R. Quinlan et al., Inferring Decision Trees Using Minimum Description Length Principle, Information and Computation 80, pp. 227–248, Jan. 1989. (0890–5401/89 Academic Press, Inc.).

(List continued on next page.)

*Primary Examiner*—Wayne Amsbury
*Assistant Examiner*—Cheryl Lewis
*Attorney, Agent, or Firm*—Khanh Q. Tran

[57] ABSTRACT

A method and system are disclosed for generating a decision-tree classifier in parallel in a multi-processor system, from a training set of records. The method comprises the steps of: partitioning the records among the processors, each processor generating an attribute list for each attribute, and the processors cooperatively generating a decision tree by repeatedly partitioning the records using the attribute lists. For each node, each processor determines its best split test and, along with other processors, selects the best overall split for the records at that node. Preferably, the gini-index and class histograms are used in determining the best splits. Also, each processor builds a hash table using the attribute list of the split attribute and shares it with other processors. The hash tables are used for splitting the remaining attribute lists. The created tree is then pruned based on the MDL principle, which encodes the tree and split tests in an MDL-based code, and determines whether to prune and how to prune each node based on the code length of the node.

18 Claims, 9 Drawing Sheets

OTHER PUBLICATIONS

Wallace et al., Coding Decision Trees, Machine Learning, 11, pp. 7–22, Jan. 1993. (Kluwer Academic Pub., Boston. Mfg. in the Netherlands.).

S. M. Weiss et al., Computer Systems that Learn, Classification and Prediction Methods from Statistics, Neural Nets, Machine Learning, and Expert Systems, pp. 113–143, Jan. 1991. Q325.5, W432, C2, Morgan Kaufmann Pub. Inc., San Mateo, CA.

MPI: A Message–Passing Interface Standard, Message Passing Interface Forum May 5, 1994.

M. Mehta, R. Agrawal & J. Rissanen, SLIQ: Fast Scalable Classifier for Data Mining, In EDBT 96, Avignon, France, Mar. 1996

R. P. Lippmann, An Introduction to Computing with Neural Nets, IEEE ASSP Magazine, pp. 4–22, 0740–7467/87/0400, Apr. 1987.

D. E. Goldberg, Genetic Algorithms in Search, Optimization, and Machine Learning, Chapter 6, Intro. to Genetics Based Machine Learning, pp. 218–257, (Book), Jan. 1989.

D. J. DeWitt, S. Ghandeharizadeh, D. A. Schneider, A. Bricker, H. Hsiao & R. Rasmussen, The Gamma Database Machine Project, IEEE Transactions on Knowledge and Data Eng. vol. 2, No. 1, pp. 44–62, Mar. 1990.

No. 08/500,717, filed Jul. 11, 1995, for System and Method for Parallel Mining of Association Rules in Databases.

No. 08/541,665, filed Oct. 10, 1995, for Method and System for Mining Generalized Sequential Patterns in a Large Database.

No. 08/564,694, filed Nov. 29, 1995, for Method and System for Generating a Decision–tree Clarifier for Data Records.

| Age | Car Type | Risk |
|-----|----------|------|
| 23 | family | High |
| 17 | sports | High |
| 43 | sports | High |
| 68 | family | Low |
| 32 | truck | Low |
| 20 | family | High |

| Rec.ID | Age | Car Type | Risk |
|---|---|---|---|
| 0 | 23 | family | High |
| 1 | 17 | sports | High |
| 2 | 43 | sports | High |
| 3 | 68 | family | Low |
| 4 | 32 | truck | Low |
| 5 | 20 | family | High |

Processor P1 48

| Age | Class | Rec ID |
|---|---|---|
| 17 | High | 1 |
| 20 | High | 5 |
| 23 | High | 0 |

Processor P2 49

| Age | Class | Rec ID |
|---|---|---|
| 32 | Low | 4 |
| 43 | High | 2 |
| 68 | Low | 3 |

*FIG. 10a*

Processor P1

Initial State 50

|  | High | Low |
|---|---|---|
| $C_{below}$ | 0 | 0 |
| $C_{above}$ | 4 | 2 |

Final State 52

|  | High | Low |
|---|---|---|
| $C_{below}$ | 3 | 0 |
| $C_{above}$ | 1 | 2 |

Processor P2

Initial State 51

|  | High | Low |
|---|---|---|
| $C_{below}$ | 3 | 0 |
| $C_{above}$ | 1 | 2 |

Final State 53

|  | High | Low |
|---|---|---|
| $C_{below}$ | 4 | 2 |
| $C_{above}$ | 0 | 0 |

*FIG. 10b*

Processor P1

| Car Type | Class | Rec.ID |
|---|---|---|
| family | High | 0 |
| sports | High | 1 |
| sports | High | 2 |

Processor P2

| Car Type | Class | Rec.ID |
|---|---|---|
| family | Low | 3 |
| truck | Low | 4 |
| family | High | 5 |

*FIG. 11a*

Processor P1 54

|  | High | Low |
|---|---|---|
| family | 1 | 0 |
| sports | 2 | 0 |
| truck | 0 | 0 |

Processor P2 55

|  | High | Low |
|---|---|---|
| family | 1 | 1 |
| sports | 0 | 0 |
| truck | 0 | 1 |

FIG. 14a (node 68)   Processor P1

70 {

| Age | Class | Rec ID |
|---|---|---|
| 17 | High | 1 |

| Car Type | Class | Rec.ID |
|---|---|---|
| sports | High | 1 |
| sports | High | 2 |

(node 69)

71 {

| Age | Class | Rec ID |
|---|---|---|
| 20 | High | 5 |
| 23 | High | 0 |

| Car Type | Class | Rec.ID |
|---|---|---|
| family | High | 0 |

FIG. 14b

Processor P2   (node 68)

| Age | Class | Rec ID |
|---|---|---|
| 43 | High | 2 |

| Car Type | Class | Rec.ID |

} 72

(node 69)

| Age | Class | Rec ID |
|---|---|---|
| 32 | Low | 4 |
| 68 | Low | 3 |

| Car Type | Class | Rec.ID |
|---|---|---|
| family | Low | 3 |
| truck | Low | 4 |
| family | High | 5 |

METHOD AND SYSTEM FOR GENERATING A DECISION-TREE CLASSIFIER IN PARALLEL IN A MULTI-PROCESSOR SYSTEM

FIELD OF THE INVENTION

The invention relates in general to computer databases, and in particular to data mining. The invention specifically relates to an efficient method and system for generating a decision tree classifier from data records in parallel by the processors of a multi-processor system.

BACKGROUND OF THE INVENTION

Data mining is an emerging application of computer databases that involves the development of tools for analyzing large databases to extract useful information from them. As an example of data mining, customer purchasing patterns may be derived from a large customer transaction database by analyzing its transaction records. Such purchasing habits can provide valuable marketing information to retailers in displaying their merchandise or controlling the store inventory. Other applications of data mining include fraud detection, store location search, and medical diagnosis.

Classification of data records according to certain classes of the records is an important part of data mining. In classification, a set of example records, referred to as a training set or input data, is provided from which a record classifier will be built. Each record of the training set consists of several attributes where the attributes can be either numeric or categorical. Numeric (or continuous) attributes are those from an ordered domain, such as employee age or employee salary. Categorical attributes are those from an unordered domain such as marital status or gender. One of these attributes, called the classifying attribute, indicates the class to which the record belongs. The objective of classification is to build a model of the classifying attribute, or classifier, based upon the other attributes. Once the classifier is built, it can be used to determine the classes of future records.

Classification models have been studied extensively in the fields of statistics, neural networks, and machine learning. They are described, for example, in "Computer Systems that Learn: Classification and Prediction Methods from Statistics," S. M. Weiss and C. A. Kulikowski, 1991. Prior art classification methods, however, lack scalability and usually break down in cases of large training datasets. They commonly require the training set to be sufficiently small so that it would fit in the memory of the computer performing the classification. This restriction is partially due to the relatively small number of training examples available for the applications considered by the prior art methods, rather than for data mining applications. Early classifiers thus do not work well in data mining applications.

In the paper "An Interval Classifier For Database Mining Applications," Proc. of the Very Large Database Conference, August 1992, Agrawal et al. described a classifier specially designed for database applications. However, the focus there was on a classifier that can use database indices to improve retrieval efficiency, and not on the size of the training set. The described classifier is therefore not suitable for most data mining applications, where the training sets are large.

Another desirable property of classifiers is their short training time, i.e., the time required to generate a classifier from a set of training records. Some prior art methods address both the execution time and memory constraint problems by partitioning the data into subsets that fit in the system memory and developing classifiers for the subsets in parallel. The output of these classifiers is then combined using various algorithms to obtain the final classification. Although this approach reduces running time significantly, studies have shown that the multiple classifiers do not achieve the same level of accuracy of a single classifier built using all the data. See, for example, "Experiments on Multistrategy Learning by Meta-Learning," by P. K. Chan and S. J. Stolfo, Proc. Second Intl. Conf. on Information and Knowledge Management, pp. 314–323, 1993.

Other prior art methods classify data in batches. Such incremental learning methods have the disadvantage that the cumulative cost of classifying data incrementally can sometimes exceed the cost of classifying all of the training set once. See, for example, "Megainduction: Machine Learning on Very Large Databases," Ph.D. Thesis by J. Catlett, Univ. of Sydney, 1991.

Still other prior art classification methods, including those discussed above, achieve short training times by creating the classifiers based on decision trees. A decision tree is a class discriminator that recursively partitions the training set until each partition consists entirely or dominantly of examples from the same class. The tree generally has a root node, interior nodes, and multiple leaf nodes where each leaf node is associated with the records belonging to a record class. Each non-leaf node of the tree contains a split point which is a test on one or more attributes to determine how the data records are partitioned at that node. Decision trees are compact, easy to understand and to be converted to classification rules, or to Structured Query Language (SQL) statements for accessing databases.

Figure 1:
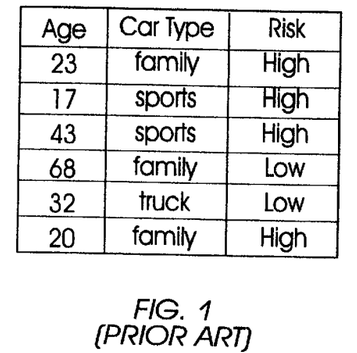
FIG. 1 shows an example of a prior art training set of records.
Figure 2:
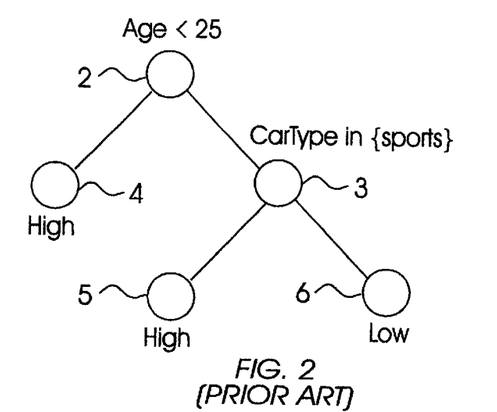
FIG. 2 illustrates a prior art decision tree corresponding to the training set of FIG. 1 in which each leaf node represents a class of records.

For example, FIG. 1 shows a training set where each record represents a car insurance applicant and includes three attributes: Age, Car Type, and Risk level. FIG. 2 shows a prior art decision tree classifier created from the training records of FIG. 1. Nodes 2 and 3 are two split points that partition the records based on the split tests (Age<25) and (Car Type in {Sports}), respectively. The records of applicants whose age is less than 25 years belong to the High Risk class associated with node 4. The records of those older than 25 years but have a sport car belong to the High Risk class associated with node 5. Other applicants fall into the Low risk class of node 6. The decision tree then can be used to screen future applicants by classifying them into the High or Low Risk categories.

As another example of decision-tree classifiers, an efficient method for constructing a scalable, fast, and accurate decision-tree classifier is described in the assignee's pending application "Method and System For Generating a Decision-Tree Classifier For Data Records," Ser. No. 08/564,694 (hereinafter '694 application), U.S. Pat. No. 5,787,274. The method described there effectively handles disk-resident data that is too large to fit in the system memory by presorting the records, building the tree branches in parallel, and pruning the tree using the Description Length (MDL) principle. Further, it forms a single decision tree using the entire training set, instead of combining multiple classifiers or partitioning the data. For more details on MDL pruning, see for example, "MDL-based Decision Tree Pruning," Intl. Conf. on Knowledge Discovery in Databases and Data Mining, pp. 216–221, 1995.

Nevertheless, the method described in the '694 application still has some drawbacks. First, it requires some data per record to stay memory-resident all the time, e.g., a class list containing the attribute values and node IDs. Since the size of this data structure grows in direct proportion to the number of input records, this places a limit on the amount of data that can be classified. Secondly, in a parallel processing environment such as a multi-processor system, the method does not take advantage of the parallelism of the multi-processor system to build the decision tree classifier more efficiently across the processors. Such parallel generation of the classifier would lead to both shorter training times and reduced system memory requirements.

Therefore, there remains a need for an efficient method for generating a decision tree classifier in parallel by the processors of a multi-processor system that is fast, compact, and scalable on large training sets.

SUMMARY OF THE INVENTION

It is an object of the present invention to provide an efficient method for generating a decision-tree classifier in parallel by the processors of a multi-processor system, from a training set of records for classifying other records.

Another object of the present invention is to obtain a decision-tree classifier that is compact, accurate, and has short training times.

Still another object of the present invention is a method for generating a classifier that is scalable on large disk-resident training sets, without restricting the size of the training set to the system memory limit.

The present invention achieves the foregoing and other objects by providing a method for generating a decision tree classifier in parallel in a multi-processor system, from a training set of records. Each record includes one or more attributes, a class label to which the record belongs, and a record ID. In accordance with the invention, the method partitions the training records generally evenly among the processors of the multi-processor system. Each processor generates in parallel with other processors an attribute list for each attribute of the records. The list includes the values for that attribute, class labels and record IDs of the records from which the attribute values are obtained. The processors then cooperatively generate a decision tree by repeatedly partitioning the records according to record classes, using the attribute lists. The final decision tree becomes the desired classifier in which the records associated with each leaf node are of the same class.

The step of generating attribute lists preferably includes the processors sorting in parallel the attribute lists for numeric attributes based on the attribute values, and distributing the sorted attribute lists among the processors.

The processors cooperatively create the decision tree by splitting the records at each examined node, starting with the root node. Each processor first determines a split test to best separate the records by record classes, using the attribute lists available in the processor. The processor shares its best split test with other processors to determine the best overall split test for the examined node. The processor then partitions the records of the examined node that are assigned to it, according to the best split test for the examined node. The partitions of records form the child nodes of the examined node and also become new leaf nodes of the tree. The records of the new leaf nodes are then similarly split. Preferably, the split tests are determined based on a splitting index corresponding to the criterion used in splitting the records.

In addition, each processor maintains for each attribute one or more variables, such as histograms, representing the distribution of the records at each leaf node. In determining a split test, the processor would traverse the attribute list for each attribute A. For each value v of A in the attribute list, the class histograms for A at the examined node are updated using the class label corresponding to v and the value v. If A is a numeric attribute, then the splitting index for the splitting criterion (A<=v) for the examined node is calculated. If A is categorical, then one of the processors collects all the class histograms for A from other processors after the scan and determines a subset of the attribute A that results in the highest splitting index for the examined node. The splitting index used is preferably a gini-index based on the relative frequency of records from each class present in the training set.

Also in the case where the attribute A is categorical, various subsets of the values of A are considered as possible split points. If the number of values for A is less than a certain threshold, then all subsets of a set S of all values of A are evaluated to find one with the highest splitting index for the examined node. If the number of values is equal to or more than the threshold, each value from set S is added, one at a time, to an initially empty set S' to find a split with the highest splitting index.

In accordance with the invention, the partitioning of records at a node by each processor includes, for an attribute B used in the split test, dividing the attribute list for B at the processor into new attribute lists corresponding respectively to the child nodes of the examined node. In dividing the attribute list, the method traverses the list to apply the split test to each entry in the list and puts the entry into a respective new list according to the test. The processor also builds a hash table with the record IDs obtained from the attribute list as it is being divided and shares the hash table with other processors. The processor partitions the remaining attribute lists of the examined node among its child nodes according to the shared hash tables.

In addition, the processor updates the histograms of each new leaf node with the distributions of records at these nodes, and shares the updated histograms with the other processors.

In another aspect of the invention, the originally created decision tree is pruned based on the MDL principle to obtain a more compact classifier. The original tree and split tests are first encoded in a MDL-based code. The code length for each node of the tree is calculated. Depending on the code lengths resulting from different pruning options at the node, the method determines whether to prune the node, and if so, how to prune it.

In a first embodiment of the pruning step, each node of the decision tree is encoded using one bit. If the code length in the case the node has no child node is less than when it has both child nodes, then both of its child nodes are pruned and it is converted to a leaf node. Otherwise, the node is left intact.

In a second embodiment, two bits are used to encode each node of the tree. The code length is evaluated for the cases where the node is a leaf node, has a left child, has a right child, and has both child nodes. A pruning option is selected from these cases that would result in the shortest code length for the node.

In a third embodiment of the pruning step, a smaller tree is first obtained using the steps of the first embodiment. The smaller tree is further pruned by examining the code length of each node for the cases where the node has only a left child, only a right child, and both child nodes. A pruning option is selected so that the shortest code length for the node is obtained.

Additional objects and advantages of the present invention will be set forth in the description which follows, and in part will be obvious from the description and with the accompanying drawing, or may be learned from the practice of this invention.

DESCRIPTION OF THE PREFERRED EMBODIMENT

The invention is primarily described as a method for generating a decision-tree classifier in parallel in a multi-processor system. However, persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Figure 3:
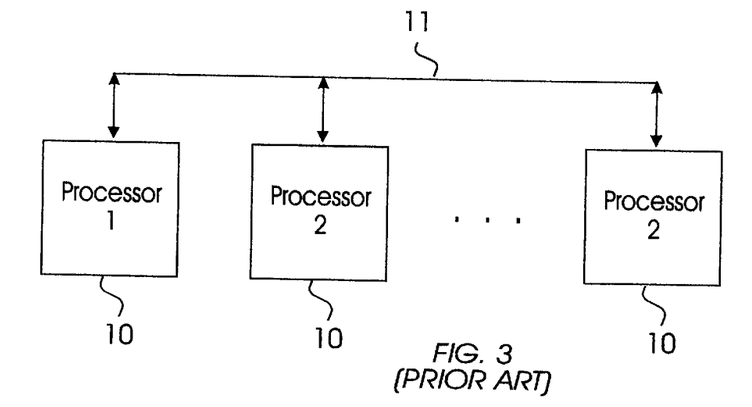
FIG. 3 is a simplified block diagram of a computer system having multiple processors upon which the present invention may be practiced.

FIG. 3 is a simplified block diagram of a multi-processor system with which the method of the invention may be practiced. The system includes several processors 10 that communicate with each other by a link 11. Each processor 10 may be implemented in hardware, software, or a combination thereof. For instance, the processors 10 may be nodes within an IBM SP2 multi-processor computer, or software tasks of a multi-task program running on a single computer. They may also be IBM RISC System/6000 workstations or currently available microprocessors interconnected by the link 11. Similarly, the link 11 may be implemented in hardware, software, or a combination thereof. For example, it may be a data bus, network, or software layer based on the Message Passage Interface (MPI) standard.

Figure 4:
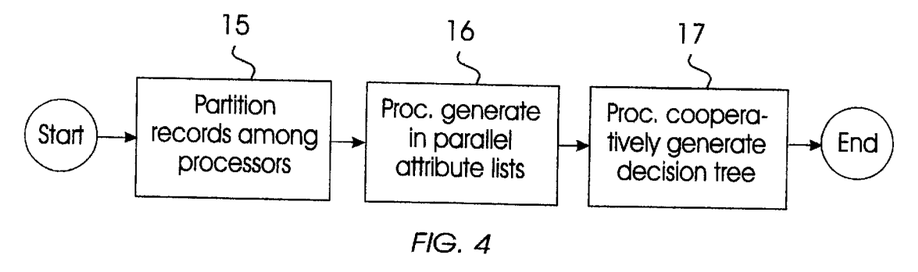
FIG. 4 is a flow chart showing the overall operation of the method of the present invention.

FIG. 4 illustrates a high-level flow chart of the method for generating a decision-tree classifier in parallel by the processors 10 in accordance with the invention, from a training set of records. Each record has one or more data attribute values, a class label of the class to which the record belongs, and a record ID. An attribute may be numeric (or continuous) such as Age, or categorical such as Car Type. Beginning with block 15, the records are partitioned among the processors 10. Generally, the records are divided evenly among the processors 10 to maintain a balanced workload in the system. However, an unequal partitioning of the records may be necessary to balance the workload of the processors when they do not have the same computing power.

At block 16, each processor 10 generates an attribute list for each attribute of the records at that processor. The processors 10 generate their attribute lists in parallel. Each record of an attribute list has an attribute value, class label, and record ID of the record from which the attribute value is obtained. The attribute list generation is described in more detail below in accordance with FIG. 7. At block 17, the processors 10 cooperatively generate a decision tree by repeatedly partitioning the records using the attribute lists. The decision tree generation by the processors is described further below in reference to FIGS. 8 through 15. The resulting decision tree after all record classes are identified becomes the decision-tree classifier.

Figure 5:
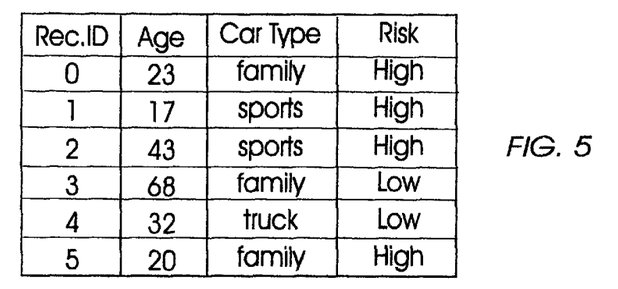
FIG. 5 illustrates an exemplary training set of records for use with the method of the invention.
Figure 6:
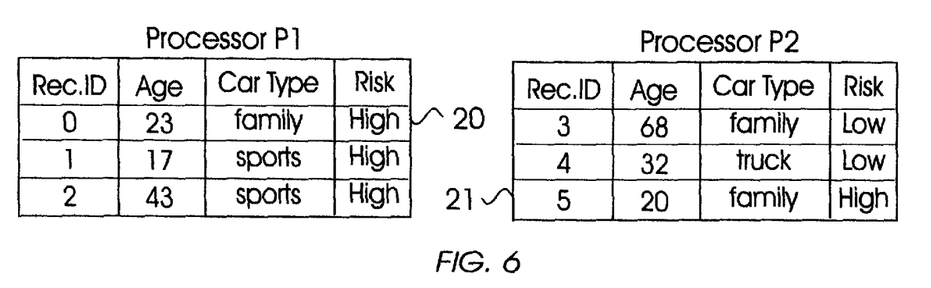
FIG. 6 illustrates a typical partitioning of the records between the two processors of a multi-processor system, according to block 15 of FIG. 4.

FIG. 5 illustrates an exemplary training set of records before they are partitioned according to block 15 of FIG. 4. Each record represents a car insurance applicant with the values of two attributes Age and Car Type, and a class label indicating the Risk level for the applicant. In this case, Age is a numeric attribute indicating the applicant's age, while Car type is a categorical attribute indicating the type of car the applicant owns. FIG. 6 shows a typical partitioning of the records of FIG. 5 between processors P1 and P2 in a two-processor system, per block 15 of FIG. 4. The records of processors P1 and P2 are in tables 20 and 21, respectively.

Figure 7:
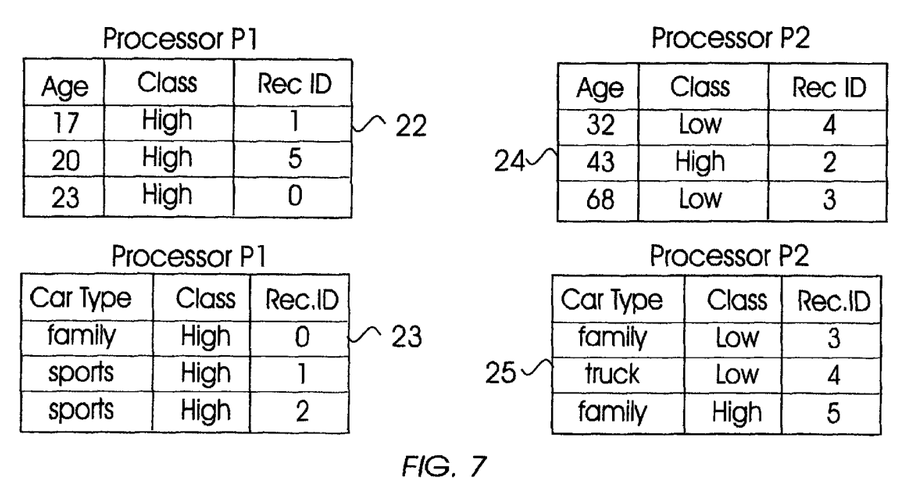
FIG. 7 illustrates the attribute lists built by the processors of the multi-processor system, according to block 16 of FIG. 4.

Referring to FIG. 7, the attribute lists generated by each of the processors P1 and P2 for the attributes Age and Car Type, according to block 16 of FIG. 4, are shown. For a categorical attribute, such as Car Type, attribute lists 23 and 25 can be generated from the records at processors P1 and P2, respectively, without further processing. For a numeric attribute such as Age, attribute lists 22 and 24 are preferably generated by processors P1 and P2, respectively, after the processors cooperatively sort their attribute lists based on attribute values and distribute the sorted lists among each other. Each processor thus has a contiguous sorted portion of the global attribute list for each attribute. A parallel sorting algorithm like the one described by D. J. DeWitt et al., "Parallel Sorting on A Shared-nothing Architecture Using Probalistic Splitting," Proc. of the First Intl. Conf. on Parallel and Distributed Information Systems, pp. 280–291, 1991, may be used for this purpose.

Generating the Decision Tree

Figure 8:
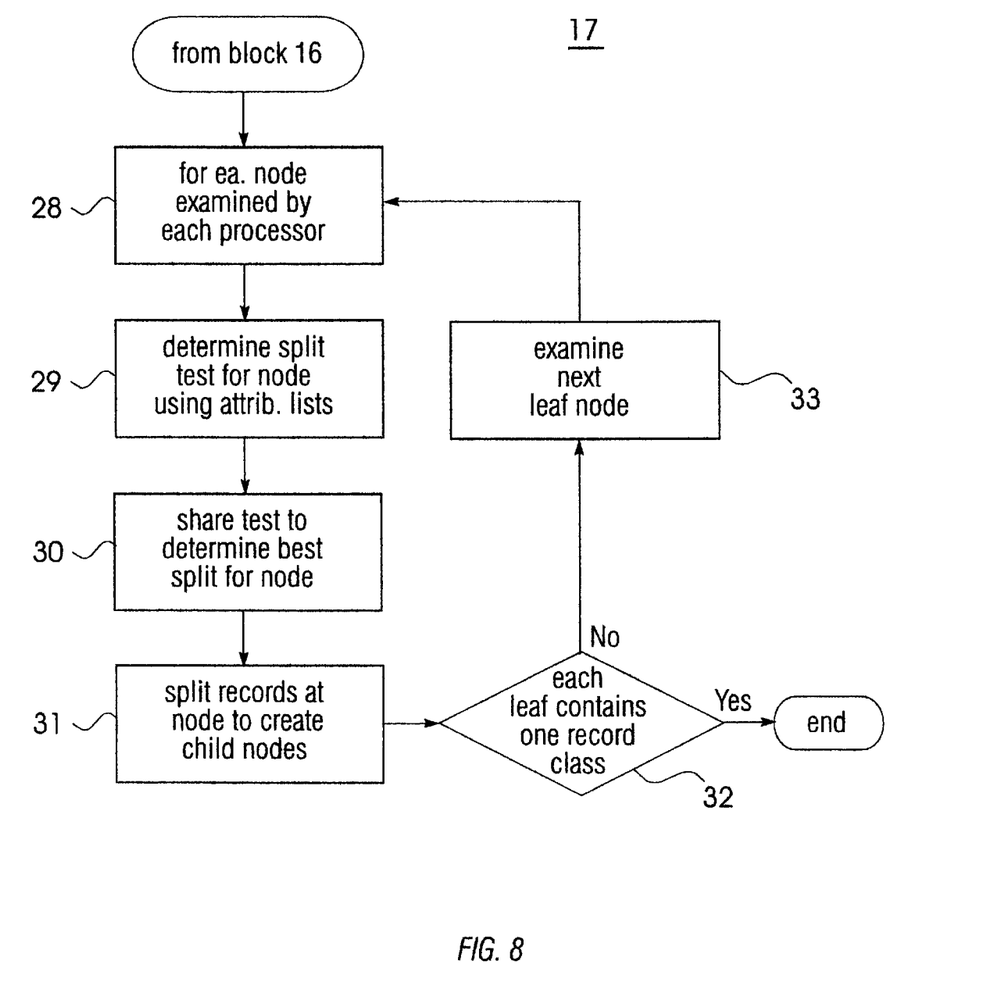
FIG. 8 is a flow chart showing further details for the step of creating the decision tree, from block 17 of FIG. 4.

FIG. 8 shows the preferred embodiment for the step of generating the decision tree cooperatively by the processors 10, from block 17 of FIG. 4. Generally, each processor examines each current leaf node and separates its records by record class to create new nodes. This process continues until all classes are identified. Note that initially, the tree is viewed as having a single leaf node that is also the root node. Starting with block 28, each processor 10, working in parallel with other processors, examines each leaf node of the decision tree. Each processor determines a split test to best separate the records at the examined node, using the attribute lists of that processor, as shown by block 29. The processor shares its best split test with other processors so that the best overall split of the records at the examined node can be determined, at block 30.

While growing the decision tree, the goal at each node is to determine the split point that best divides the training records belonging to that node. The value of a split point depends on how well it separates the classes. Thus, a splitting index corresponding to a criterion used for splitting the records may be used to help determine the split test at each leaf node. Preferably, the splitting index is a gini-index as described, for example, by Brieman et al. in "Classification and Regression Trees", Wadsworth, 1984. The advantage of the gini-index is that its calculation requires only the distribution of the class values in each record partition. For instance, to find the best split point for a node, the node's attribute lists are scanned to evaluate the splits for the attributes. The attribute containing the split point with the lowest value for the gini-index is used to split the node's records. The evaluation of the split points is described further below in reference to FIG. 9.

At block 31, the processor 10 splits the records at the examined node, that are assigned to the processor, according to the best overall split test for the examined node. Each group of records forms a new leaf node of the tree and is also a child node of the examined node. At block 32, the processor checks to see if each leaf node now contains records from only one class. If this condition has not been achieved, the processor repeats the process starting with block 28 for each leaf node.

Figure 9:
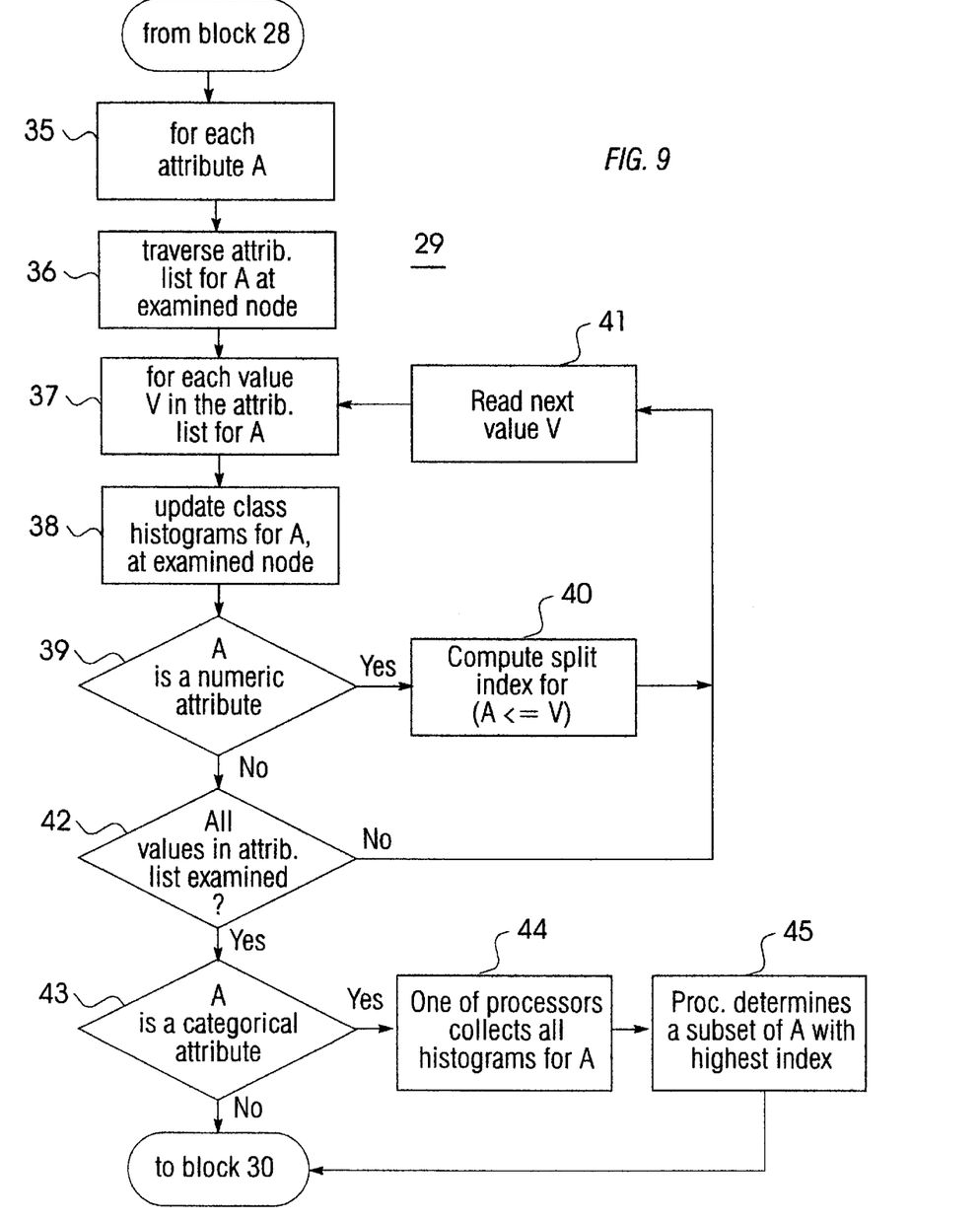
FIG. 9 is a flow chart showing further details for the step of determining a split test at each examined node, from block 29 of FIG. 8.

FIG. 9 shows further details for the step of determining a split test from block 29 of FIG. 8. To help evaluate the split tests, a variable showing the distribution of records by record class at each leaf node may be used. For example, for each leaf node, each processor may have a histogram for each categorical attribute showing the class distribution of the records at that node. For each numeric attribute, the processor typically maintains two histograms, $C_{below}$ and $C_{above}$. They are initialized to reflect, respectively, the distributions of the records preceding those assigned to the processor and the records following the first record assigned to the processor, including this first record.

Starting with block 35 of FIG. 9, for each attribute A, the processor traverses the attribute list for A at the examined node in block 36. For each value v of the attribute list, the processor updates the class histograms for A at the examined node with the class label corresponding to v and the value v, as shown by block 38. If A is determined in block 39 to be numeric, the splitting index for the splitting criterion ($A \leq v$) at the examined node is computed at block 40. Another attribute value v is then examined, at block 41, until the complete list is traversed, at block 42. If A is a categorical attribute, one of the processors 10 collects all the class histograms for A from other processors (block 44) to determine a subset of the attribute A that results in the highest splitting index for the examined node, at block 45. The determination of this subset will be further described below in reference to FIG. 12.

Figure 10A:
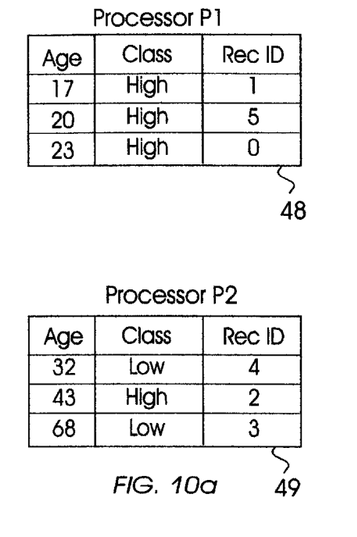
FIGS. 10a and 10b illustrate the numeric attribute lists in the processors and the respective histograms of the processors, according to block 38 of FIG. 9.
Figure 10B:
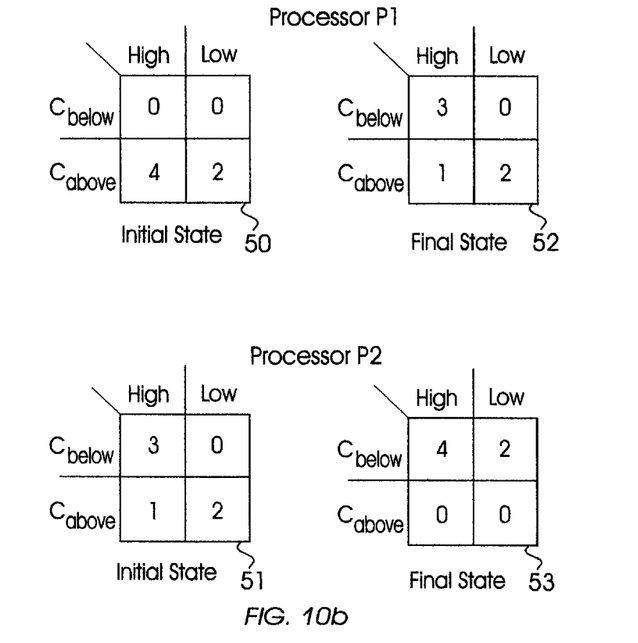

FIGS. 10a and 10b illustrate how the histograms for the numeric attribute Age are updated by the processors P1 and P2. In FIG. 10a, the attribute lists for Age in processors P1 and P2, from FIG. 7, are shown respectively as tables 48 and 49. FIG. 10b represents the initial state and final state of the $C_{below}$ and $C_{above}$ histograms for attribute Age, according to the steps of FIG. 9. The initial state of the histograms in processors P1 and P2 (tables 50 and 51, respectively) reflects the class distribution in each processor before the Age attribute lists are traversed, according to block 36, FIG. 9. The final state of the histograms in processors P1 and P2 (tables 52 and 53, respectively) reflects the distribution in each processor after the histograms are updated according to block 38 of FIG. 9.

Figure 11A:
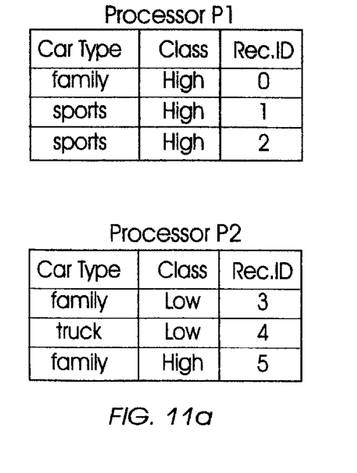
FIGS. 11a and 11b illustrate the categorical attribute lists in the processors and the respective histograms of the processors, according to block 44, FIG. 9.
Figure 11B:
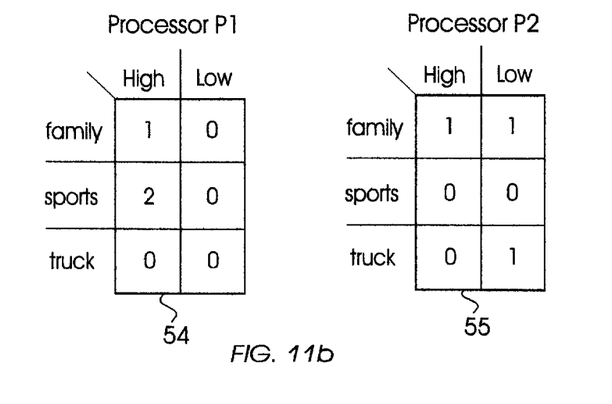

Similarly, FIGS. 11a and 11b illustrate the attribute lists for the categorical attribute Car Type and the histograms for this attribute in the processors, respectively. In FIG. 11a, the attribute lists for Car Type for processors P1 and P2 are reproduced from FIG. 7. The histograms for attribute Car Type maintained by P1 and P2 are shown as tables 54 and 55, respectively, in FIG. 11b.

Figure 12:
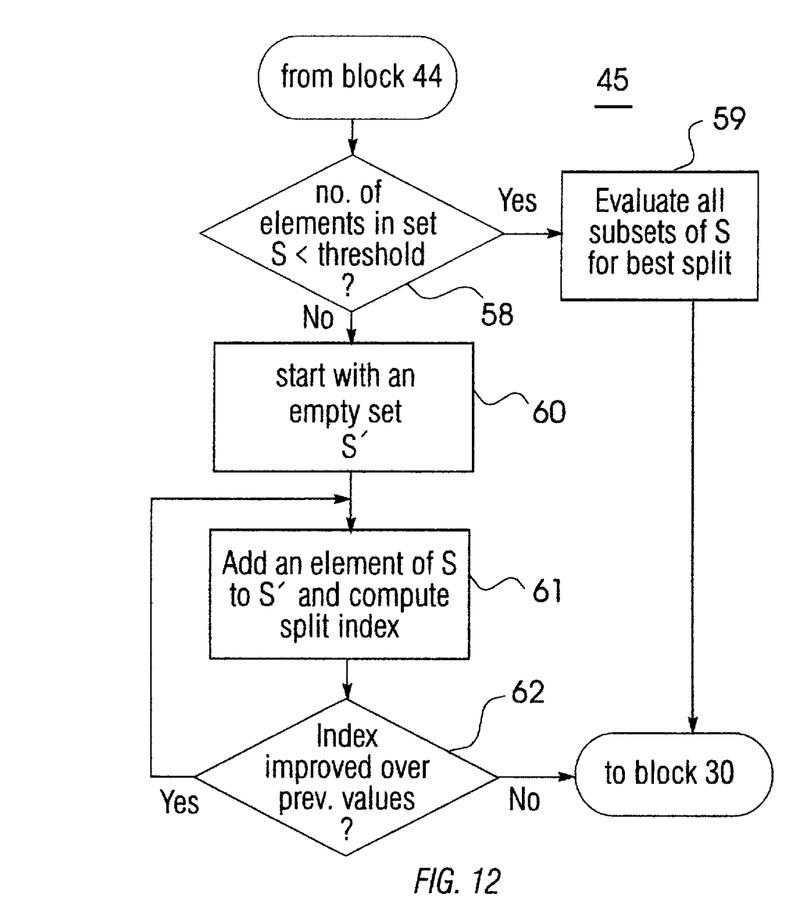
FIG. 12 is a flow chart showing further details for the step of determining a subset of the attribute values with the highest splitting index, from block 45, FIG. 9.

Referring now to FIG. 12, a preferred embodiment for block 45 of FIG. 9, for determining a subset of a categorical attribute A with the highest splitting index, is shown as a flow chart. At block 58, the cardinality of A, i.e., the number of elements in the set S of all the values of A, is compared to a predetermined threshold. If the cardinality is less than the threshold, all subsets of S are evaluated to find the best split, at block 59. Otherwise, a greedy algorithm may be used for subsetting. For instance, starting with an empty set S' at block 60, each element of set S is added to S', one at a time, and a corresponding splitting index is computed at block 61. This incremental addition to S' continues until there is no further improvement in the splitting index, as determined by block 62.

Figure 13:
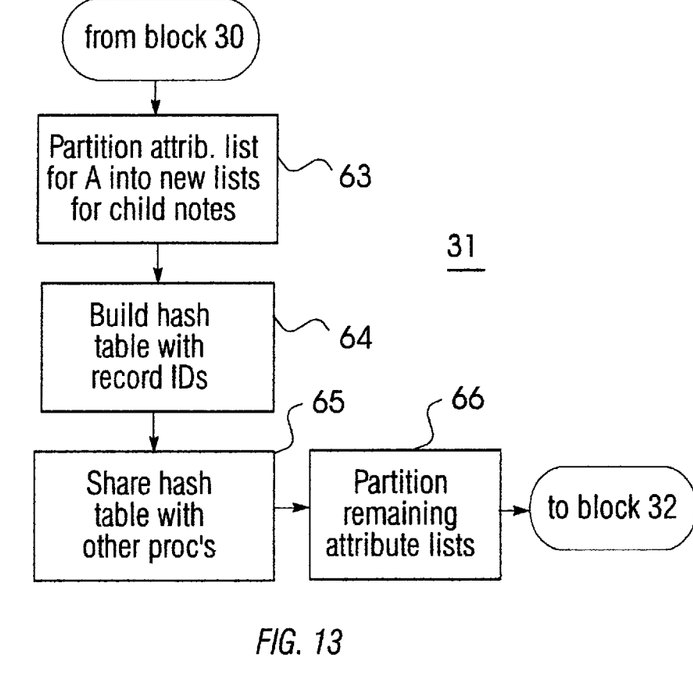
FIG. 13 is a flow chart showing further details for the step of splitting the records at a node to create child nodes, from block 31, FIG. 8.

FIG. 13 shows further details for the step of splitting the records per block 31 of FIG. 8. At block 63, the attribute list for an attribute B used in the split test is partitioned into new attribute lists, one for each child node of the examined node. The processor typically traverses the original attribute list, applies the split test to each entry in the list, and puts the entry into the respective new list according to the test. At block 64, the processor also builds a hash table with the record IDs from the entries of the attribute list for B as the entries are distributed among the new attribute lists. The processor then shares its hash table with other processors, at block 65, and partitions the remaining attribute lists among the child nodes of the examined node, according to the collected hash tables, at block 66.

Figure 14A:
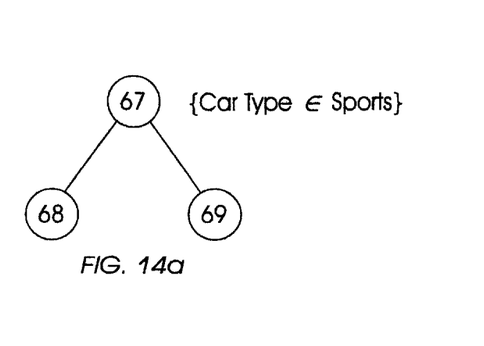
FIG. 14a illustrates a part of the decision tree as the records at node 67 are split to create child nodes, according to block 31 of FIG. 8.
Figure 14B:
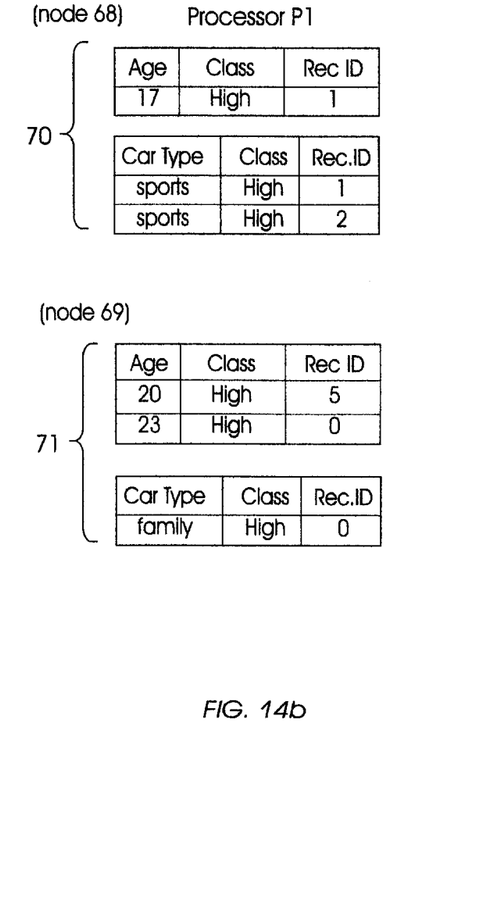
FIGS. 14b and 14c show how the attribute lists of the node 67 are partitioned into new attribute lists for the child nodes of node 67, from block 63 of FIG. 13.
Figure 14C:
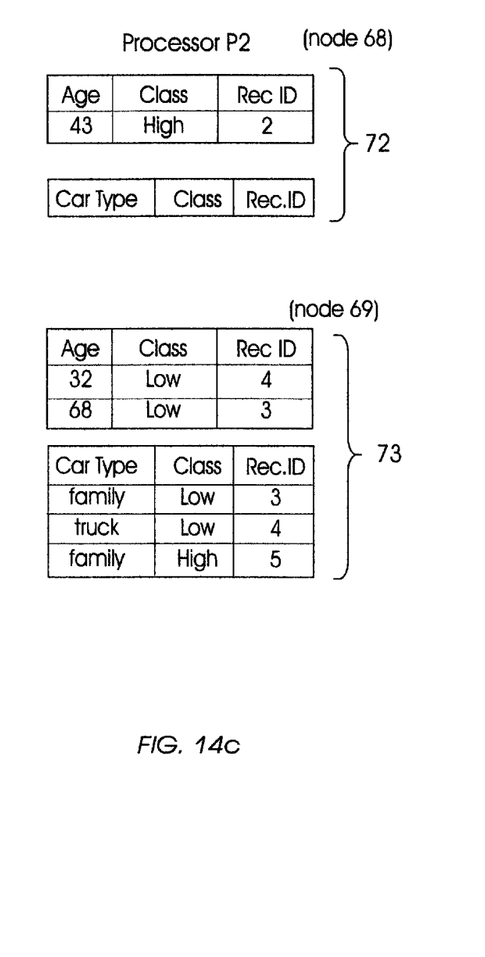

FIGS. 14a through 14c illustrate how the attribute lists of FIG. 7 are partitioned into new attribute lists according to block 63, FIG. 13. FIG. 14a shows a part of the decision tree being generated with a node 67 and its child nodes 68 and 69. Suppose the split test at node 67 is whether the insurance applicant's car is of a sport type, i.e., {Car Type ∈ Sports}. FIG. 14b illustrates attribute lists 70 and 71 in processor P1 for child nodes 68 and 69, respectively. Attribute lists 70 and 71 are created when processor P1 partitions its attribute lists for node 67 (blocks 23 and 23 of FIG. 7) according to step 63, FIG. 13. Similarly, FIG. 14c shows attribute lists 72 and 73 in processor P2 for child nodes 68 and 69, respectively. They are created when processor P2 partitions its attribute lists for node 67 (blocks 24 and 25 of FIG. 7).

Pruning the Decision Tree

In order to obtain a compact classifier, the decision tree as created may further be pruned to remove extraneous nodes. Preferably, the pruning algorithm is based on the Minimum Description Length (MDL) principle so that a subset of the child nodes at each node may be discarded without over-pruning the tree. The pruning step is illustrated in more detail in FIGS. 15 through 18.

The MDL principle generally states that the best model for encoding data is one that minimizes the sum of the cost of describing the data in terms of the model and the cost of describing the model. If M is a model that encodes data D, the total cost of encoding, cost(M, D), is defined as:

$$\text{cost}(M, D) = \text{cost}(D|M) + \text{cost}(M)$$

where the cost of encoding X, cost(X), is defined as the number of bits required to encode X. Here, the models are the set of trees obtained by pruning the original decision tree T, and the data is the training set S. Since the cost of encoding the data is relatively low, the objective of MDL pruning will be to find a subtree of T that best describes the training set S.

Figure 15:
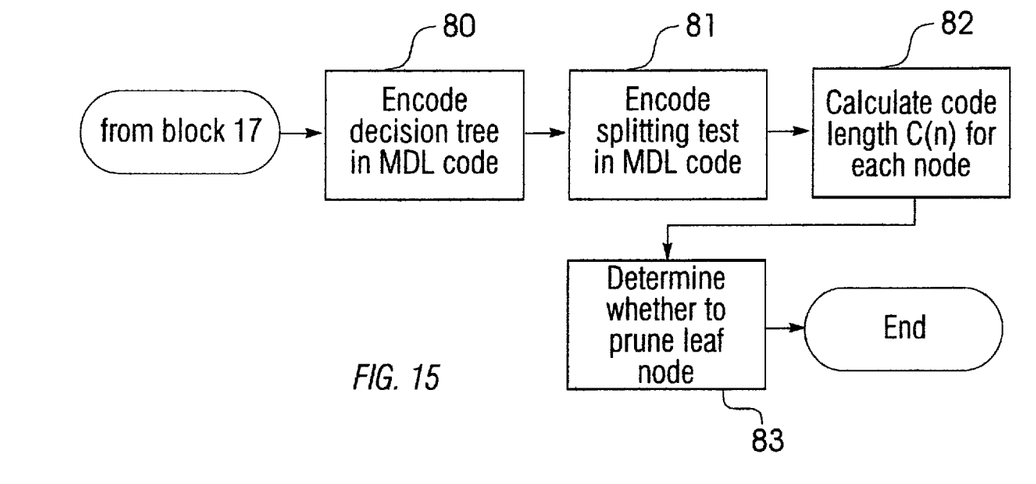
FIG. 15 is a flow chart showing the steps for pruning the decision tree based on the Minimum Description Length principle to obtain the decision-tree classifier.

Referring to FIG. 15, a typical pruning of the decision tree based on the MDL principle is shown. It consists of two main phases: (a) encoding the tree and (b) determining whether to prune the tree and how it is pruned, based on the cost of encoding. First, at block 80, the tree is encoded in a MDL-based code. The preferred encoding methods are described below in reference to FIGS. 16, 17, and 18. The split tests for the leaf nodes are also encoded with the MDL-based code, as shown by block 81. Next, for each node n of the tree, a code length C(n) for the node is computed in block 82 for each pruning option, and evaluated in block 83 to determine whether to convert the node into a leaf node, to prune its left or right child node, or to leave node n intact.

The code length C(t) for the test options at a node n is calculated as follows:

(i) $C_{leaf}(t) = L(t) + \text{Errors}_t$, if t is a leaf node (Option 1)

(ii) $C_{both}(t) = L(t) + L_{test} + C(t_1) + C(t_2)$, if t has both child nodes (Option 2)

(iii) $C_{left}(t) = L(t) + L_{test} + C(t_1) + C'(t_2)$, if t has only child node $t_1$ (Option 3);

and (iv) $C_{right}(t) = L(t) + L_{test} + C'(t_1) + C(t_2)$, if t has only child node $t_2$ (Option 4), where $L_{test}$ is the cost of encoding any test at an internal node, L(t) is the cost of encoding the node itself, $\text{Errors}_t$ represents the misclassification errors at the node, $C(t_i)$ is the cost of encoding the $i^{th}$ subtree, and $C'(t_i)$ is the cost of encoding a child node's records using the parent node's statistics.

Figure 16:
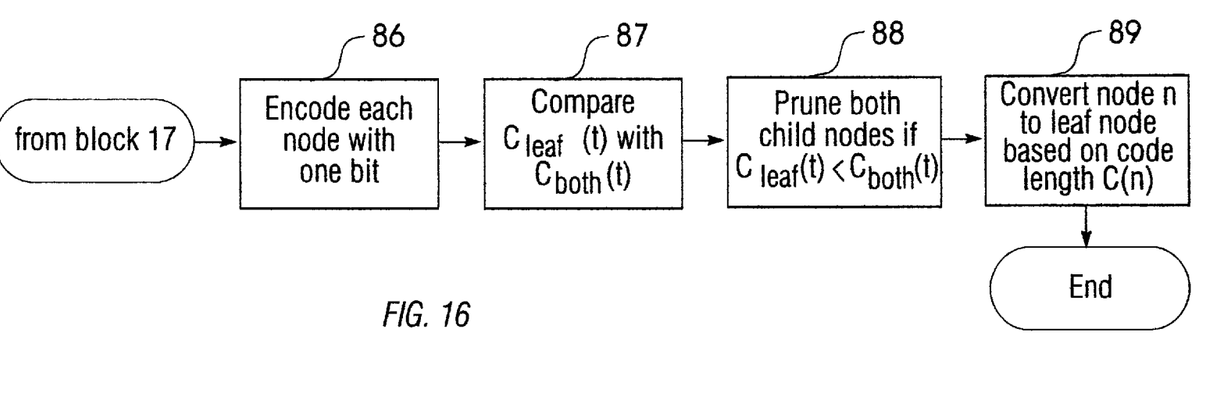
FIG. 16 is a flow chart showing the Full pruning embodiment for the pruning steps of FIG. 15.

In FIGS. 16 through 18, the flow charts of the preferred embodiments of the step of pruning of FIG. 15 are shown. The embodiment in FIG. 16 is referred to as Full pruning and is used when a node may have zero or two child nodes (options 1 and 2). Accordingly, only one bit is needed to encode each node of the tree, shown by block 86. At block 87, the code length $C_{leaf}(t)$ when the node has no child nodes is compared to the code length $C_{both}(t)$ when it has both child nodes. If $C_{leaf}(t)$ is less than $C_{both}(t)$, both child nodes of the test node are pruned and the node is converted into a leaf node, as shown by blocks 88 and 89.

Figure 17:
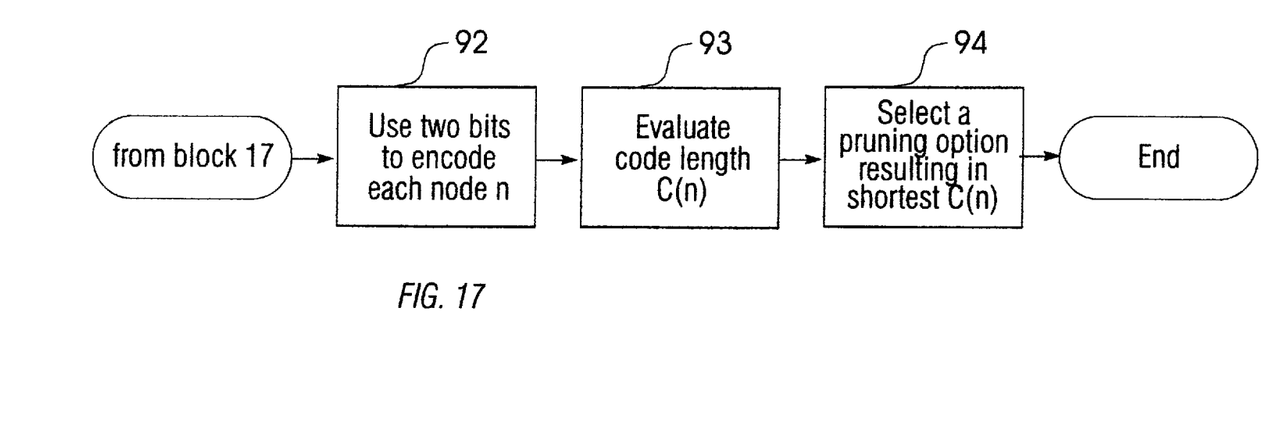
FIG. 17 is a flow chart showing the Partial pruning embodiment for the pruning steps of FIG. 15.

FIG. 17 shows another embodiment of the step of pruning from FIG. 15, referred to as Partial pruning. Partial pruning is desirable where all four options are applicable to each tree node, i.e., the node is a leaf node, has only a left child node or a right child node, or has both child nodes. At block 92, two bits are used to encode each node n of the decision tree. The code lengths for the four options are evaluated at block 93 and the option with the shortest code length for node n is selected at block 94.

Figure 18:
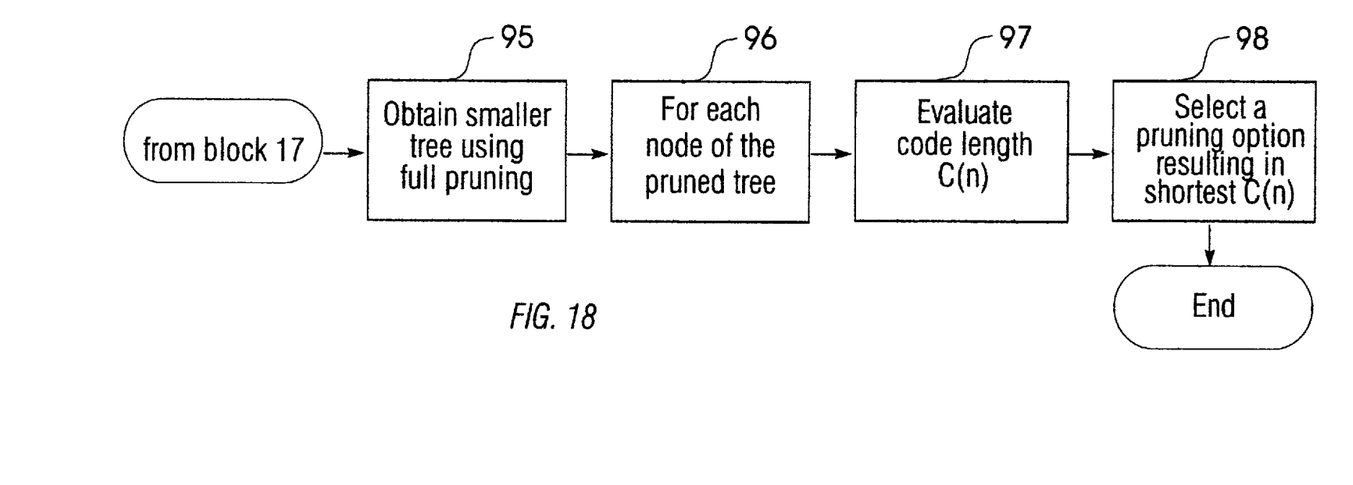
FIG. 18 is a flow chart showing the Hybrid pruning embodiment for the pruning steps of FIG. 15.

Finally, FIG. 18 shows a third preferred embodiment of the pruning step from FIG. 15 that combines Full pruning and Partial pruning, and is appropriately referred to as Hybrid pruning. The Hybrid method prunes the decision tree in two phases. At block 95, it first uses Full pruning to obtain a smaller tree from the originally generated tree. It then considers only options 2, 3, and 4, i.e., where the node has a left child, a right child, or both, to further prune the smaller tree. For these three options, log(3) bits are used for encoding each node. At blocks 96 and 97, for each node of the smaller tree, the code lengths corresponding to the three options are evaluated to select a pruning option that results in the shortest code length for the node, as shown by block 98.

Parallelizing Other Classification Methods

Existing classification methods may be similarly parallelized in a multi-processing environment as described above. For instance, the method for generating a classifier in the assignee's pending application '694 (also described in "SLIQ: A Fast Scalable Classifier For Data Mining," Proc. of the EDBT '96 Conf., Avignon, France, 1996) may be parallelized by replicating the class list in each processor of a multi-processor system or distributing the class list among the processors. The SLIQ method uses a class list in which each entry contains a class label and node ID corresponding to a leaf node.

In the replication method, the class list for the entire training set is replicated in the local memory of every processor. The split tests are evaluated in the same manner as described above in reference to FIGS. 8, 9, and 12. However, the partitioning of the attribute lists according to a chosen split test (block 63 of FIG. 13) is different as the execution of the split points requires updating the class list for each record. Since every processor must maintain a consistent copy of the entire class list, every class-list update must be communicated to and applied by every processor.

To minimize communications among the processors, a technique similar to the one described in reference to FIGS. 9, 10a–b, and 11a–b may be used where only the smaller half of each split is communicated and updated by the processors. As a result, updates to the replicated class lists can be exchanged in small batches or in a single communication.

In the distribution method, each processor of the system contains a portion of the class list for all the records. The partitioning of the class list has no correlation with the partitioning of the numeric attribute lists. The class label corresponding to an attribute value in one processor may reside in another processor. Thus, the two processors communicate when it is necessary to find a non-local class label in the case of a numeric attribute. This inter-processor communication is not necessary for categorical attributes since the class list is created from the original partitioned training set and perfectly correlated with the categorical attribute lists.

The split tests are evaluated in the same manner as described above in reference to FIGS. 8, 9, and 12. In traversing the attribute list of a numeric attribute, a processor may request another processor to look up a corresponding class label. It may also have to service look-up requests from other processors. This inter-processor communications, however, may be minimized by batching the look-ups to the distributed class lists.

Using the foregoing specification, the invention may be implemented using standard programming or engineering techniques including computer programming software, firmware, hardware or any combination or subset thereof. Any such resulting program, having computer-readable program code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links, communication devices, servers, I/O devices, or any sub-components or individual parts of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system or computer sub-component embodying the invention and to create a computer system or computer sub-component for carrying out the method of the invention.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A computer program product for use with a computer system for directing the system to generate a decision-tree classifier in parallel from a training set of records, the system having a plurality of processors, each record having: (i) at least one attribute, each attribute having a value, (ii) a class label of the class to which the record belongs, and (iii) a record ID, the computer program product comprising:

a computer readable medium;

means, provided on the computer-readable medium, for directing the system to partition the records among the processors of the system;

means, provided on the computer-readable medium, for directing each processor to generate in parallel an attribute list for each attribute of the records, each entry in the attribute lists having the attribute value, class label, and record ID of the record from which the attribute value is obtained; and means, provided on the computer-readable medium, for directing the processors to cooperatively create a decision tree, the decision tree being formed by repeatedly partitioning the records using the attribute lists, the resulting decision tree becoming the decision-tree classifier.

2. The computer program product as recited in claim 1, wherein:

the attributes include numeric attributes; and the means for directing each processor to generate the attribute lists includes:

means, provided on the computer-readable medium, for directing the processor to sort the attribute lists for the numeric attributes based on the attribute values; and means, provided on the computer-readable medium, for directing the processor to distribute the sorted attribute lists among the processors.

3. The computer program product as recited in claim 1, wherein the attributes include categorical attributes.

4. The computer program product as recited in claim 1, wherein:

the decision tree includes a root node, a plurality of interior nodes, and a plurality of leaf nodes, all of the records initially belonging to the root node; and the means for directing to create a decision tree includes, for each processor and for each node being examined until each leaf node of the decision tree contains only one class of records:

a) means, provided on the computer-readable medium, for directing the processor to determine a split test to best separate the records at the examined node by record classes, using the attribute lists of the processor;

b) means, provided on the computer-readable medium, for directing the processor to share the split test with the other processors to determine a best overall split test for the examined node; and c) means, provided on the computer-readable medium, for directing the processor to split the records of the examined node that are assigned to the processor, according to the best overall split test for the examined node, to create child nodes for the examined node, the child nodes becoming new leaf nodes.

5. The computer program product as recited in claim 4, wherein the means for directing to determine a split test is based on a splitting index corresponding to a criterion for splitting the records.

6. The computer program product as recited in claim 5, wherein the splitting index includes a gini-index based on relative frequencies of records from each record class present in the training set.

7. The computer program product as recited in claim 5, wherein:

each processor includes, for each leaf node, a plurality of histograms for each attribute of the records at the leaf node, the histograms representing the class distribution of the records at the leaf node; and the means for directing to determine a split test includes:
a) means, provided on the computer-readable medium, for directing the processor to traverse, for each attribute A, the attribute list for A at the examined node;
b) for each value v of A in the attribute list for A:
  i) means, provided on the computer-readable medium, for directing the processor to update the class histograms for A, at the examined node, with the class label corresponding to v and the value v; and
  ii) if the attribute A is numeric, then means, provided on the computer-readable medium, for directing the processor to compute the splitting index corresponding to splitting criterion (A<=v) for the examined node; and
c) if the attribute A is categorical, then:
  i) means, provided on the computer-readable medium, for directing a first processor to collect all the class histograms for A from all the processors; and
  ii) means, provided on the computer-readable medium, for directing the first processor to determine a subset of the attribute A that results in the highest splitting index for the examined node.

8. The computer program product as recited in claim 7, wherein the histograms for each numeric attribute include a $C_{below}$ histogram and a $C_{above}$ histogram, the $C_{below}$ histogram corresponding to the class distribution of the records preceding those assigned to the processor, and the $C_{above}$ histogram corresponding to the class distribution of the records following a first record assigned to the processor, including the first record.

9. The computer program product as recited in claim 7, wherein the means for directing to determine a subset of the attribute A includes:

if a number of elements in a set S of all values of A is less than a predetermined threshold, then means, provided on the computer-readable medium, for directing the first processor to evaluate all subsets of the set S to find one with the highest splitting index; and if the number of elements in S is equal to or more than the predetermined threshold, then means, provided on the computer-readable medium, for directing the first processor to:
a) add an element of S to an initially empty subset S' of S such that the splitting index for the splitting criterion at the examined node is maximized; and
b) repeat the adding until there is no improvement in the splitting index.

10. The computer program product as recited in claim 4, wherein the means for directing to split the records includes:

means, provided on the computer-readable medium, for directing the processor to partition the attribute list for an attribute B used in the split test into new attribute lists corresponding, respectively, to the child nodes of the examined node;

means provided on the computer-readable medium, for directing the processor to build a hash table with the record IDs from the entries of the attribute list for B as the entries are partitioned among the new attribute lists;

means, provided on the computer-readable medium, for directing the processor to share the hash table for attribute B with other processors; and means, provided on the computer-readable medium, for directing the processor to partition the remaining attribute lists of the examined node among the newly created child nodes according to the hash tables shared by the processors.

11. The computer program product as recited in claim 10, wherein the means for directing to partition the attribute list includes:

means, provided on the computer-readable medium, for directing the processor to traverse the attribute list for attribute B;

means, provided on the computer-readable medium, for directing the processor to apply the split test to each entry of the attribute list for B; and means, provided on the computer-readable medium, for directing the processor to enter the entry into a respective new attribute list according to the split test.

12. The computer program product as recited in claim 10, wherein the means for directing to create a decision tree further comprises:

means, provided on the computer-readable medium, for directing the processor to update the histograms for each newly created child node with the distribution of records at the child node; and means, provided on the computer-readable medium, for directing the processor to share the updated histograms with other processors so that all the histograms remain updated.

13. The computer program product as recited in claim 4 further comprising means, provided on the computer-readable medium, for directing the system to prune the decision-tree classifier to obtain a more compact classifier.

14. The computer program product as recited in claim 13, wherein:

the means for directing to prune is based on a Minimum Description Length (MDL) principle that encodes the decision tree as a model such that an encoding cost for describing the decision tree and the training set is minimized;

the means for directing to prune includes:
means, provided on the computer-readable medium, for directing the system to encode the decision tree in an MDL-based code;
means, provided on the computer-readable medium, for directing the system to encode the split tests for the leaf nodes in the MDL-based code;
means provided on the computer-readable medium, for directing the system to calculate a code length C(n) for each node n of the decision tree; and
means, provided on the computer-readable medium, for directing the system to determine whether to prune the child nodes of node n, convert n into a leaf node, or leave n intact, depending on the encoding cost; and the encoding cost is based on the code length C(n).

15. The computer program product as recited in claim 14, wherein:
   a) the means for directing to encode the decision tree includes:
      (i) means, provided on the computer-readable medium, for directing the system to encode each node of the decision tree using one bit, if the node has two or no child nodes;
      (ii) means, provided on the computer-readable medium, for directing the system to encode each node of the decision tree using two bits, if the node has one, two, or no child nodes; and
      (iii) means, provided on the computer-readable medium, for directing the system to encode each internal node of the decision tree using log(3) bits; and
   b) the encoding cost includes:
      (i) a cost for encoding an attribute value v of an attribute A, where a split test is of the form (A≦v) and A is numeric; and
      (ii) a cost related to $\ln(n_A)$ where $n_A$ is a number of times the split test is used in the tree and A is a categorical attribute.

16. The computer program product as recited in claim 14, wherein:
   each node n of the decision tree is encoded using one bit; and
   if the code length C(n) in the case n has both child nodes is more than C(n) in the case n is a leaf node, then the means for directing to determine whether to prune includes:
      means, provided on the computer-readable medium, for directing the system to prune both child nodes of the node n; and
      means, provided on the computer-readable medium, for directing the system to convert the node n into a leaf node.

17. The computer program product as recited in claim 16 further comprising:
   means, provided on the computer-readable medium, for directing the system to evaluate, for each node n of the pruned decision tree, the code length C(n) when n has only a left child node, n has only a right child node, and n has both child nodes; and
   means, provided on the computer-readable medium, for directing the system to select a pruning option that results in a shortest code length C(n).

18. The computer program product as recited in claim 14, wherein:
   each node n of the decision tree is encoded using two bits; and
   the means for directing to determine whether to prune includes:
      means, provided on the computer-readable medium, for directing the system to evaluate the code length C(n) when n is a leaf node, n has only a left child node, n has only a right child node, and n has both child nodes; and
      means, provided on the computer-readable medium, for directing the system to select a pruning option that results in a shortest code length C(n).

* * * * *